Feb. 11, 1930.　　　C. R. RAGSDALE　　　1,746,317
DRAFT ARM FOR SODA FOUNTAINS
Filed Aug. 14, 1928
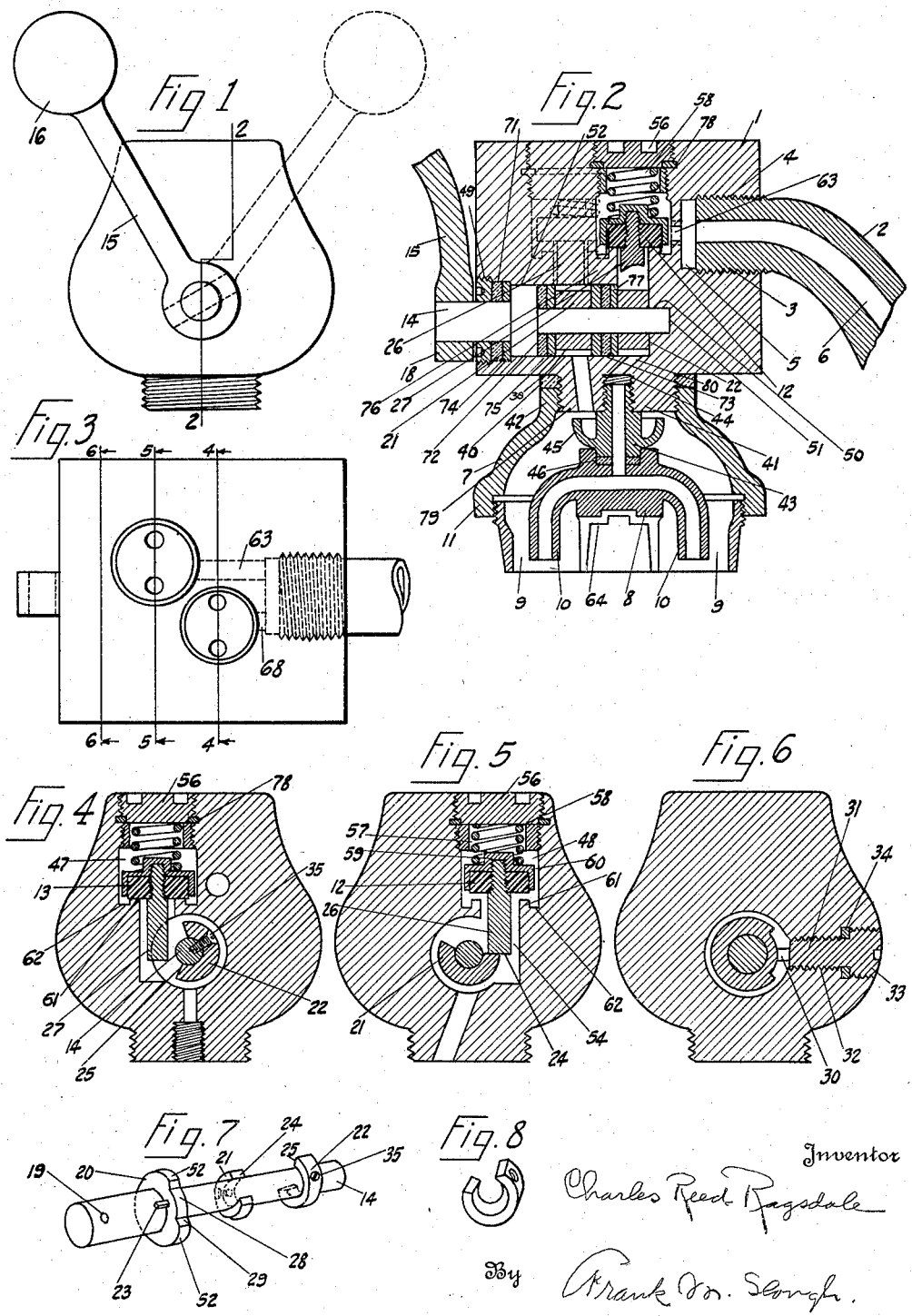

Patented Feb. 11, 1930

1,746,317

UNITED STATES PATENT OFFICE

CHARLES REED RAGSDALE, OF ST. LOUIS, MISSOURI

DRAFT ARM FOR SODA FOUNTAINS

Application filed August 14, 1928. Serial No. 299,529.

My invention relates to draft arms for soda fountains and the like and relates particularly to fluid dispensing draft arms of the type commonly employed in connection with soda fountains for dispensing carbonated water for beverages, wherein the carbonated water is adapted to be dispensed either in a coarse, relatively slow flowing stream, or a relatively fine stream flowing with considerable force from the draft arm.

The draft arm of my present invention is intended more particularly as an improvement on the draft arm and attachment therefor disclosed in Letters Patent 1,408,397, granted to me on February 28, 1922.

An object of the present invention is to provide an improved fluid flow controlling mechanism for draft arms, which is efficient in use, relatively inexpensive to manufacture, and which may be assembled and/or disassembled readily and inexpensively.

Another object of my invention is to provide an improved controlling head for draft arms comprising an improved positively operating novel controlling mechanism for fine and coarse stream controlling valves, whereby advantages in manufacture and use are achieved.

Another object of my invention is to provide an improved fluid flow controlling head for draft arms comprising valves and valve operating mechanism whereby the valves are positively operated to permit or to discontinue fluid flow under relatively high pressure of fluid obtaining in the use of draft arms for soda fountains and the like, and without incidental leakage during periods of non-use.

Another object of my invention is to provide a draft arm mechanism comprising an improved controlling head and pair of dispensing nozzles therefor, each of which is adapted to receive the fine and coarse streams of carbonated water or the like from the head end control of the valve mechanism thereof, for dispensing to one or more glasses at a time, as may be desired in the manner substantially as described in my said prior patent.

Another object of my invention is to provide a unitary valve operating mechanism for a draft arm head whereby a single lever arm may be easily rotated to different operative positions to operate the fine and coarse stream valves to efficiently dispense the carbonated water or the like from the head in a most desirable efficient manner.

Another object of my invention is to provide a draft arm head with controlling mechanism therein adaptable to efficiently dispense carbonated water or the like, from a draft arm shank which supports the head through the head, to a plurality of dispensing nozzle spouts, which are adapted for projection into a single glass or other receptacle, or into a plurality of glasses up to the number of nozzle spouts.

Another object of my invention is to provide an improved draft arm head for dispensing carbonated water or the like for beverages wherein the operating parts are disposed in recesses of the head which are so placed and disposed that they may be easily provided by inexpensive manufacturing operations and whereby they are easily accessible for cleaning, repair or substitution, as the need may arise.

Other objects of my invention and the invention itself will become more apparent from the following description of an embodiment of my invention and wherein reference will be made to the accompanying drawings illustrating the said embodiment.

Referring to the drawings:

Fig. 1 is an end elevational view of a draft arm head, embodying the principles of my invention.

Fig. 2 shows in longitudinal, stepped, sectional view, on the line 2—2 of Fig. 1, the head supported on the upper end of the shank of a draft arm, a fragment of the shank only being shown; the view also shows a pair of nozzles pendently supported from the head.

Fig. 3 is a plan view of the draft arm head of Fig. 1.

Fig. 4 is a transverse section through the head, taken on the line 4—4 of Fig. 3.

Fig. 5 is a transverse section of the head taken on the line 5—5 of Fig. 3.

Fig. 6 is a transverse section taken on the line 6—6 of Fig. 3.

Fig. 7 shows in isometric view, a cam shaft for the head of Fig. 1, together with a cam and a pair of valve lifters secured thereon; and Fig. 8 is an isometric view of one of a pair of valve lifters comprised in said embodiment.

Referring now to all of the figures of drawing in all of which like parts are designated by like reference characters, at 1 I show a draft arm head supported on the upper forwardly extending end of the tubular shank 2 of a draft arm, being screw threaded as shown at 3, by its threaded recess 5, thereon.

The shank is provided with a tubular bore 6 for the communication from a suitable source, of carbonated water, or the like, to the interior of the draft arm head 1.

At 7 I show a nozzle support which is generally in the form of a bell with an enlarged open mouth 11, and a relatively smaller open throat 42 both being interiorly threaded, to secure the support to the head 1, and to retain the nozzle element on the support, respectively.

A composite nozzle element is screw threaded upwardly into the support and comprises a pair of coarse stream discharge spouts 9, on its bottom end in suitably spaced tandem relation, and supports a fine stream spout element which comprises a pendant pair of fine stream spouts 10, each disposed in telescoped co-axial relation relative to the enclosing course stream spouts 9. The ends of the interiorly disposed fine stream spouts are preferably disposed within the interior of the coarse stream spouts.

The nozzle support 7 and spouts supported thereby are preferably similar to that shown in my prior Patent, No. 1,408,397, patented February 28, 1922, to which reference may be had for a more complete description thereof, although obviously other modifications thereof may be employed in connection with the invention herein disclosed. A fluid sealing gasket 40 is preferably interposed between the contiguous surfaces of the upper end of the nozzle and the lower face of the head.

A fluid conduit fitting 43 is screw threaded into an upwardly bored recess 44 extending axially into the boss 41 and preferably formed with an upwardly extending peripheral flange 45 of bowl form.

The fitting 43 is axially bored, its bore communicating with the bores of the fine stream nozzles 10 which extend divergingly therefrom, forming in combination with the bore of the fitting 43, a bifurcated fine stream passageway which extends divergingly through the two fine stream spouts 10. The fine stream spout element, by its hub portion 8, is clamped tightly between the recessed wall 64 of the coarse stream spout element 11, and the fitting 43, and a gasket 46 is interposed between the lowermost annular end of the fitting and the contiguous upper annular surface of the hub of the spout element, in a recess of the hub 8, which also receives the end of the fitting.

A pair of reciprocable valves 12 and 13, disposed within the head, are adapted to control the communication of fluid, under pressure, from the bore 6 of the draft arm to the different fine stream and coarse stream spouts. These valves are operable, in a very efficient manner, by virtue of the provision of a rotatable valve controller shaft 14 which projects from the head 1 and is journalled in the head 1; an operating lever 15 terminating in a knob 16, is secured to the outer end of the controller shaft 14.

A screw 17 is preferably passed through the hub 18 of the lever and diametrically into a threaded hole 19 through the outer end of the shaft. The shaft is shown at 14, Fig. 7, together with a stop collar 20 and a pair of valve lifter elements 21 and 22, all rigidly secured on the shaft intermediate its ends, and disposed in spaced relation thereon. The stop collar is fitted tightly onto the shaft 14 and may be provided with a key 23 indented mutually into the adjacent surfaces of the collar and the shaft to prevent relative rotation thereof. The valve lifters 21 and 22 are preferably in the form of interrupted collars, each having a valve stem engaging end face 24 and 25 respectively, for engagement with the respective lower ends of valve stems 26 and 27. The valve lifters are rigidly secured on the shaft 14 by screws 35 projected radially therein.

The collar 20 is inwardly notched at 28 from its periphery to provide spaced stop faces 29 engageable with lateral surfaces of a reduced end 30 of a stop screw 31, screw threaded into the head casing. The screw 31 is provided with a suitably formed head 33 which, by its inner surfaces, presses a gasket 34 to a seat for sealing the threaded casing bore 32 against escape of fluid.

The head 1 is recessed longitudinally at 5 and 38, from its rear and front faces respectively, to respectively admit the threaded end of the draft arm shank projected in the recess 5, and to receive the valve controlling apparatus comprising the shaft 14, in the recess 38.

The valves 12 and 13, of which two or more are preferably provided, cooperate with two or more valve lifters, such as 21 and 22, and are respectively disposed in recesses 47 and 48 of the draft arm head. Passages 54 extend inwardly therefrom to communicate with the transverse recess 38 containing the controlling shaft 14.

The recess 38 and the recesses 47 and 48 vary longitudinally in the form of their interior walls, the recess 38 having an enlarged internally threaded mouth portion 49 and a bearing portion 50 of reduced diameter adapted to receive and form a bearing for the end 51 of the shaft 14, and the intermediate portion of the recess 38 forming a bearing for the arcuately formed surfaces 52 of the stop collar 20.

Closure caps 56, whose inner ends are recessed at 57 to receive compression springs 58, are screw threaded into the walls of the recesses. The springs 58 are fitted over the upwardly extending projection 59 of the valves, and resiliently seat the valves. The valves 12 and 13 each comprise a stem 27, the valve disc proper and a valve holder comprising a cup 60 having an axial projection 59 into which the reduced end of the valve stem 27 is screw threaded to clamp the valve disc to the stem.

The valves 12 and 13 are each provided with a compression spring 58 and a recess closure cap 56, except that the valve 13 and associated parts is preferably larger than the valve 12 and its associated parts. The recesses 47 and 48 comprise preferably an annular sub-recess portion 62, disposed below the level of the seat 61 and surrounding it, so that proper definite seating of the valve 13 with the seat 61 may be insured upon downward movement of the valve. The head is bored at 63 and 68 to effect communication between the recess 5 and the recesses 47 and 48.

A fluid such as carbonated water dispensed from the head is prevented from flowing from one valve passage to another or from either of the valve passages longitudinally of the shaft 14 to the exterior of the head, by leather packing washers 71, 72 and 73, and brass washers 74, 75, 76 and 77 are provided to compress the packing washers causing them to expand radially to make the different fluid passages substantially fluid-tight by packing engagement with the walls of the recess 38 and the exterior surfaces of the shaft 14.

The brass washers 76 and 75 abut the end surfaces of the valve lifter 21, and the brass washer 77 abuts the surface of the valve lifter 22, to support all contiguous portions of the adjacent leather packing washer. Gaskets are interposed under the heads of the caps 56, as illustrated at 78, also to prevent leakage of fluid from the head.

The head is bored to provide coarse stream and fine stream discharge ducts 79 and 80 for the lifter valves 21 and 22 respectively, which control the operation of the valves 12 and 13 respectively. The discharge duct 79, upon the lifting of the valve 12, communicates fluid admitted through the opened valve port to the interior of the bowl 45, which overflows, preferably substantially evenly, over all its peripheral surface, thence flowing downwardly in all directions in equal parts through the two coarse stream nozzle spouts 9.

Fluid communicated through the valve port opened by lifting of the valve 13, passes through the duct 80 into the axial bore of the fitting 43, and thence divergently through the two fine stream spouts 10. The spout passages for the fine stream, whose flow is controlled by movements of the valve 13, are small relative to the passages for the coarse stream controllable by the valve 12, and, therefore, the fine stream will be projected from its spouts 10 with much greater force than will the coarse stream from the large spouts 9.

Although the view in Fig. 3 shows the companion spouts aligned parallel with the longitudinal axis of the shaft 14, for convenience in illustration, preferably these spouts will be turned at right angles to the position illustrated in Fig. 3, so that the spouts will be laterally disposed relative to the operator facing the head from in front of the handle 15.

The different parts of the apparatus are assembled substantially as illustrated and described. The handle 15, fixed on the shaft 14, is rotated to an intermediate position wherein neither of the valve stems 26 or 27 are engaged by the end faces 24 or 25 of their associated valve lifters 21 or 22, respectively.

The like compression springs 58 for the valves 12 and 13 respectively, under such a condition, will continuously press the valves to their seats 61, closing the valve ports defined by such seats.

From the foregoing description it will be claimed that rotation of the handle 15 over the shaft 14 from such an intermediate neutral position, will cause engagement of either the face 24 of the valve lifter 21 and its associated valve stem 26, or engagement of the face 25 of the valve lifter 22 and the associated valve stem 27, according to whether the rotation of the shaft 14 is clockwise, viewed from the handle end, or counter-clockwise.

The engagement of the faces 29 of the collar 20 with the stop 30, will prevent excessive rotation of the shaft 14. A plurality of stop screws such as the screw 31, having stop projections 30 of different thicknesses, will be preferably provided, so that the amount of lift of the valves may be controlled, since with a thicker stop the shaft would not be capable of being rotated so far as with a thinner stop.

The valve recesses and controlling shaft recesses for the head are preferably so disposed thereon that they may be accurately and inexpensively provided by boring operations or by inexpensive die-casting operations, and are so disposed as to be capable of being formed simultaneously by boring.

Having thus described my invention in a specific embodiment, I am aware that numerous and extensive departures may be made from the embodiment herein illustrated and described, but without departing from the spirit of my invention.

I claim:

1. In a dispensing apparatus for soda fountains, the combination with a tubular draft arm, a draft head supported thereon, tubular nozzle means pendant from the draft head, a pair of valves in the draft arm, a pair of springs each operating to press a different valve to its seat to close a valve port, said head comprising passages leading from the bore of the tubular supporting arm to the approach side of both said valve ports, separate discharge ducts for communicating fluid from the discharge side of the valve ports to the nozzle means, and valve controlling mechanisms for alternately operating the valves, comprising a rotatable shaft, valve stems for the valves and a pair of valve lifters secured to the shaft, each of said lifters having a stem engaging face disposed radial to the axis of the shaft in a different angular relation thereto from the other lifter, said lifters being each of arcuate form and disposed to embrace the shaft.

2. In a dispensing apparatus for soda fountains, the combination with a tubular draft arm, a draft head supported thereon, tubular nozzle means pendant from the draft head, a pair of valves in the draft arm, a pair of springs each operating to press a different valve to its seat to close a valve port, said head comprising passages leading from the bore of the tubular supporting arm to the approach side of both said valve ports, separate discharge ducts for communicating fluid from the discharge side of the valve ports to the nozzle means, and valve controlling mechanisms for alternately operating the valves comprising a rotatable shaft, valve stems for the valves and a pair of valve lifters secured to the shaft, each of said lifters having a stem engaging face disposed radial to the axis of the shaft in a different angular relation thereto from the other lifter, each of said lifters being disposed in a different one of the said discharge ducts, said nozzle means comprising a fine stream spout of relatively small bore and a coarse stream spout of relatively large bore surrounding the fine stream spout, each of said discharge ducts communicating with a different one of said bored passages for the spouts.

3. In a dispensing apparatus for soda fountains, the combination with a tubular draft arm, a draft head supported thereon, tubular nozzle means pendant from the draft head, a pair of valves in the draft arm, a pair of springs each operating to press a different valve to its seat to close a valve port, said head comprising passages leading from the bore of the tubular supporting arm to the approach side of both said valve ports, separate discharge ducts for communicating fluid from the discharge side of the valve ports to the nozzle means, and valve controlling mechanisms for alternately operating the valves comprising a rotatable shaft, valve stems for the valves and a pair of valve lifters secured to the shaft, each of said lifters having a stem engaging face disposed radial to the axis of the shaft in a different angular relation thereto from the other lifter, each of said lifters being disposed in a different one of the said discharge ducts, said nozzle means comprising a fine stream spout of relatively small bore and a coarse stream spout of relatively large bore surrounding the fine stream spout, each of said discharge ducts communicating with a different one of said bored passages for the spouts, packing means surrounding the shaft between the lifters, adapted to restrain flow of fluid longitudinally of the shaft between the discharge ducts containing said lifters.

4. In a dispensing apparatus for soda fountains, the combination with a tubular draft arm, a draft head supported thereon, tubular nozzle means pendant from the draft head, a pair of valves in the draft arm, a pair of springs each operating to press a different valve to its seat to close a valve port, said head comprising passages leading from the bore of the tubular supporting arm to the approach side of both said valve ports, separate discharge ducts for communicating fluid from the discharge side of the valve ports to the nozzle means, and valve controlling mechanisms for alternately operating the valves, comprising a rotatable shaft, valve stems for the valves and a pair of valve lifters secured to the shaft, each of said lifters having a stem engaging face disposed radial to the axis of the shaft in a different angular relation thereto from the other lifter, each of said lifters being disposed in a different one of the said discharge ducts, said nozzle means comprising a fine stream spout of relatively small bore and a coarse stream spout of relatively large bore surrounding the fine stream spout, each of said discharge ducts communicating with a different one of said bored passages for the spouts, packing means surrounding the shaft between the lifters, adapted to restrain flow of fluid longitudinally of the shaft between the discharge ducts containing said lifters, and relatively rigid washers disposed on the two sides of the packing means adapted to support the end faces of the same, and to compressively expand the packing radially.

5. In a dispensing apparatus for soda fountains, the combination with a tubular draft arm, a draft head supported thereon, tubular nozzle means pendant from the draft head, a pair of valves in the draft arm, a pair of springs each operating to press a different valve to its seat to close a valve port, said head comprising passages leading from the bore of the tubular supporting arm to the approach side of both said valve ports, separate discharge ducts for communicating fluid from the discharge side of the valve ports to the nozzle means, and valve controlling mechanisms for alternately operating the valves, comprising a rotatable shaft, valve lifter means secured to the shaft and rotatable therewith, and valve stems secured to the valves and alternatively engageable by oppositely disposed faces of the valve lifter means according to the direction of rotation of the shaft, and stop means to limit rotation of the shaft to a predetermined angular movement in two directions from an intermediate neutral position, said lifters being so disposed on the shaft as to effect disengagement of their stem engaging faces with the stems when the shaft is rotated to said neutral position.

6. In a dispensing apparatus for soda fountains, the combination with a tubular draft arm, a draft head supported thereon, tubular nozzle means pendant from the draft head, a pair of valves in the draft arm, a pair of springs each operating to press a different valve to its seat to close a valve port, said head comprising passages leading from the bore of the tubular supporting arm to the approach side of both said valve ports, separate discharge ducts for communicating fluid from the discharge side of the valve ports to the nozzle means, and valve controlling mechanisms for alternately operating the valves, comprising a rotatable shaft, valve lifter means secured to the shaft and rotable therewith, and valve stems secured to the valves and alternatively engageable by oppositely disposed faces of the valve lifter means according to the direction of rotation of the shaft, and stop means to limit rotation of the shaft to a predetermined angular movement in two directions from an intermediate neutral position, said lifters being so disposed on the shaft as to effect disengagement of their stem engaging faces with the stems when the shaft is rotated to said neutral position, said stop means comprising a collar affixed to the shaft, longitudinally peripherally notched, and a fixed stop supported by the head projected into the notch of the collar and engageable by the opposite edge surfaces of the notch.

In testimony whereof I hereunto affix my signature this seventh day of August, 1928.

CHARLES REED RAGSDALE.